US010996177B2

(12) United States Patent
Robbins

(10) Patent No.: US 10,996,177 B2
(45) Date of Patent: May 4, 2021

(54) AUTOMATED INSPECTION SYSTEM FOR COMPOSITE STRUCTURES

(71) Applicant: The Boeing Company, Chicago, IL (US)

(72) Inventor: Kevin Larry Robbins, Winnipeg (CA)

(73) Assignee: The Boeing Company, Chicago, IL (US)

( * ) Notice: Subject to any disclaimer, the term of this patent is extended or adjusted under 35 U.S.C. 154(b) by 111 days.

(21) Appl. No.: 16/502,265

(22) Filed: Jul. 3, 2019

(65) Prior Publication Data
US 2021/0003513 A1    Jan. 7, 2021

(51) Int. Cl.
| | |
|---|---|
| *G06K 9/00* | (2006.01) |
| *G01N 21/956* | (2006.01) |
| *G06T 7/70* | (2017.01) |
| *G06F 3/14* | (2006.01) |
| *G06T 7/00* | (2017.01) |
| *G06T 7/60* | (2017.01) |

(52) U.S. Cl.
CPC . *G01N 21/95607* (2013.01); *G01N 21/95692* (2013.01); *G06F 3/14* (2013.01); *G06T 7/001* (2013.01); *G06T 7/60* (2013.01); *G06T 7/70* (2017.01); *G06T 2207/30164* (2013.01)

(58) Field of Classification Search
None
See application file for complete search history.

(56) References Cited

U.S. PATENT DOCUMENTS

| | | | |
|---|---|---|---|
| 7,495,758 B2 | 2/2009 | Walton | |
| 8,937,657 B2* | 1/2015 | Klass | G01B 11/2513 |
| | | | 348/136 |
| 9,214,018 B1* | 12/2015 | Engelbart | G06T 11/00 |
| 9,939,391 B1* | 4/2018 | Hohman | G01N 29/221 |
| 2002/0130262 A1* | 9/2002 | Nakasuji | H01J 37/185 |
| | | | 250/311 |
| 2006/0056585 A1* | 3/2006 | Georgeson | G01N 29/2487 |
| | | | 378/57 |
| 2006/0191622 A1* | 8/2006 | Ritter | G06T 7/12 |
| | | | 156/64 |
| 2006/0201252 A1* | 9/2006 | Georgeson | G01N 29/2487 |
| | | | 73/641 |
| 2007/0034313 A1 | 2/2007 | Engelbart et al. | |
| 2007/0280501 A1 | 12/2007 | Walton | |

(Continued)

OTHER PUBLICATIONS

Such et al., "Intelligent Composite Layup by the Application of Low Cost Tracking and Projection Technologies," Procedia CIRP, vol. 25, Dec. 2014, 10 pages.

(Continued)

*Primary Examiner* — Shervin K Nakhjavan
(74) *Attorney, Agent, or Firm* — Yee & Associates. P.C,

(57) ABSTRACT

An automated inspection system for composite structures is provided. The automated inspection system comprises an optical system, a database of model data, and a computer system. The optical system is configured to take a measurement of the feature in relation to a reference element. The optical system then creates image data based on the measurement of the feature. The computer system is configured to compare the image data to model data and determine whether the measurement of the feature is within selected tolerances.

20 Claims, 11 Drawing Sheets

(56) References Cited

U.S. PATENT DOCUMENTS

| | | | |
|---|---|---|---|
| 2012/0086800 A1* | 4/2012 | Vladimirsky | G06K 9/2036 |
| | | | 348/128 |
| 2012/0206703 A1* | 8/2012 | Bhattacharyya | G03F 7/705 |
| | | | 355/67 |
| 2013/0329204 A1* | 12/2013 | Pellemans | G03F 7/70483 |
| | | | 355/67 |
| 2016/0102966 A1* | 4/2016 | Grossnickle | G01B 11/06 |
| | | | 356/630 |
| 2016/0102973 A1 | 4/2016 | Gonze et al. | |
| 2017/0052070 A1* | 2/2017 | Marsh | G01N 25/72 |
| 2017/0248406 A1* | 8/2017 | Shadmehri | G01N 21/1717 |
| 2017/0365049 A1 | 12/2017 | Ioachim | |
| 2019/0101383 A1* | 4/2019 | Ioachim | G01B 11/2513 |
| 2020/0226770 A1* | 7/2020 | Rueb | H04N 9/3161 |
| 2020/0250806 A1* | 8/2020 | Kuwahara | G06T 7/60 |

OTHER PUBLICATIONS

European Patent Office Extended Search Report, dated Oct. 13, 2020, regarding Application No. 20172475.4, 10 pages.

* cited by examiner

AUTOMATED INSPECTION SYSTEM FOR COMPOSITE STRUCTURES

BACKGROUND INFORMATION

1. Field

The present disclosure relates generally to manufacturing composite structures. More specifically, the present disclosure relates to an automated inspection system used when manufacturing composite structures for aircraft applications.

2. Background

Manufacturers use composite structures to provide lightweight and structurally sound parts for various applications. Increasing the efficiency of the composite manufacturing process is a priority for aircraft manufacturers. They seek to lower costs and increase the rate at which an aircraft is produced while minimizing the risk of rework or discarding of composite parts during the process.

Each composite structure must be inspected to ensure compliance with aviation regulations and manufacturer specifications. Inspection may include measurement of different types of features in the composite structure. Such features may include, for example, without limitation, ply orientation or distance measurements between core features in a honeycomb core. Values are recorded at multiple points along the structure.

Once measurements are taken, those values are validated by comparing the actual measurements to nominal values. If the values are within selected tolerances for the feature, the manufacturing process continues and the part is eventually placed in operation. If the values are not within selected tolerances, the part may be reworked, discarded, or slotted for additional inspection.

Typically, human operators provide manual inspection of these features along the composite structure. Manual inspection and validation may take more time and use more manpower than desired.

Therefore, it would be desirable to have a method and apparatus that takes into account at least some of the issues discussed above, as well as other possible issues.

SUMMARY

An illustrative embodiment of the present disclosure provides an automated inspection system for a composite structure comprising an optical system, a database of model data, and a computer system. The optical system is configured to take a measurement of the feature in relation to a reference element. The optical system then creates image data based on the measurement of the feature. The computer system is configured to compare the image data to model data and determine whether the measurement of the feature is within selected tolerances.

Another illustrative embodiment of the present disclosure provides a method for inspecting a composite structure, in real-time, as the composite structure is being formed. A feature in the composite structure is measured relative to a reference element projected by an overhead laser template. Image data is created based on the measurement of the feature. The image data is sent to a computer system. The image data is compared to model data in the database, which represents nominal or desired values for the measurement. A determination is made as to whether the measurement of the feature is within selected tolerances. Once the determination is made, the process either continues or halts to address any process parameters resulting in measurements outside selected tolerances. The image data is also stored in the database and integrated into the model data. The collection of image data is used to provide statistical process control during the entire formation cycle of the composite structure.

A further illustrative embodiment of the present disclosure provides an automated inspection system for a composite structure for an aircraft. The automated inspection system comprises a laser system, an optical system, a database, and a computer system. The laser system has a template with a reference element for a feature on a surface of the composite structure. The optical system has image data derived from a number of measurements of a feature in the composite structure. The database has model data for the feature in the composite structure.

The characteristics and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current inspection techniques for validating ply orientation for composite pre-preg may take more time than desired. In some cases, every ply in the composite part is validated for ply orientation at one or more locations along the part. Most of this process is done manually, with the use of protractors and other handheld measurement tools, which takes countless manpower hours to complete. Parts having ply orientations outside selected tolerances at one or more locations may need rework.

The illustrative embodiments also recognize and take into account that when using honeycomb core, inspection must be completed at the bondline where two or more pieces of core are bonded together. Much like ply orientation, the process of manually validating Tmax values and bondline locations using handheld tools is labor intensive and lengthy. Human operators inspect each splice in some cases, comparing the actual bondline locations with a template projected from overhead. Parts with values outside selected tolerances may be reworked or discarded.

Further, the illustrative embodiments recognize and take into account that manufacturers desire methods to monitor the health of the manufacturing process in real time. It is desirable to identify trends in the way composite structures are formed and correct inconsistencies before they result in values outside selected tolerances. In other words, manufacturers seek statistical process control of part formation, which reduces predicable failures in the process. Currently used methods do not adequately contemplate integrated data collection and storage that can be used to correct such issues.

Thus, the disclosed embodiments provide an automated inspection system for a composite structure. The automated inspection system comprises a laser system, an optical system, a database of model data, and a computer system. The laser system is configured to project a template onto the composite structure. The template visually depicts a reference element on the surface of the composite structure. The optical system then measures a location and/or orientation of a feature in the composite structure relative to the reference element. The optical system is further configured to create image data based on the measurement of the feature. The computer system is configured to compare the image data to model data and determine whether the measurement of the feature is within selected tolerances. Data from each measurement cycle is stored in the database for comparison and monitoring. As the values approach selected tolerances, the process can be corrected to ensure that the feature in the composite part stays within tolerance, thus providing statistical process control during formation of the composite structure.

Figure 1:
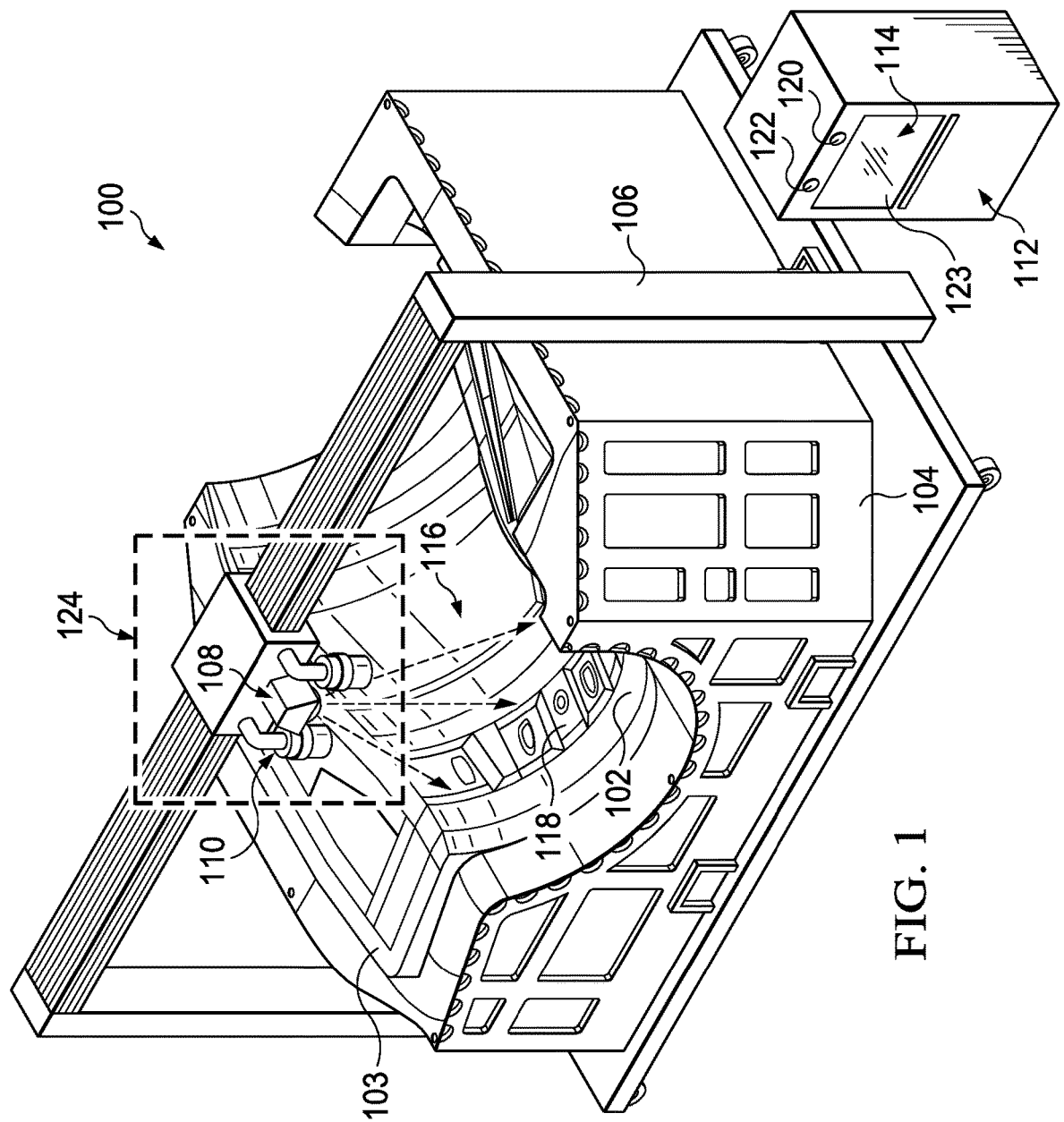
FIG. 1 is an illustration of a perspective view of an automated inspection system in accordance with an illustrative embodiment.

With reference now to the figures and, in particular, with reference to FIG. 1, an illustration of a perspective view of an automated inspection system is depicted in accordance with an illustrative embodiment. Automated inspection system 100 comprises a combination of automated components and/or devices capable of inspecting composite structure 102 positioned on tool 103. Support structure 104 supports tool 103 as processes are performed on composite structure 102. Support structure 104 moves tool 103 relative to automated inspection system 100.

As depicted, automated inspection system 100 is connected to gantry 106. Automated inspection system 100 includes laser system 108, optical system 110, computer system 112, and display system 114.

Automated inspection system 100 is used to inspect features in composite structure 102. Laser system 108 projects template 116 onto surface 118 of composite structure 102 for comparison to measurements taken by optical system 110.

Display system 114 has indicator 120, indicator 122, and screen 123. Indicator 120 lights up when measured values are within selected tolerances. Indicator 122 lights up when measured values are outside selected tolerances. Screen 123 shows various information about the formation of composite structure 102 in real time. For instance, screen 123 may show a graph representing the measurements taken by optical system 110 for statistical process control purposes. Of course, other information may be shown on screen 123. Section 124 with automated inspection system 100 is shown in greater detail in FIG. 3.

Figure 2:
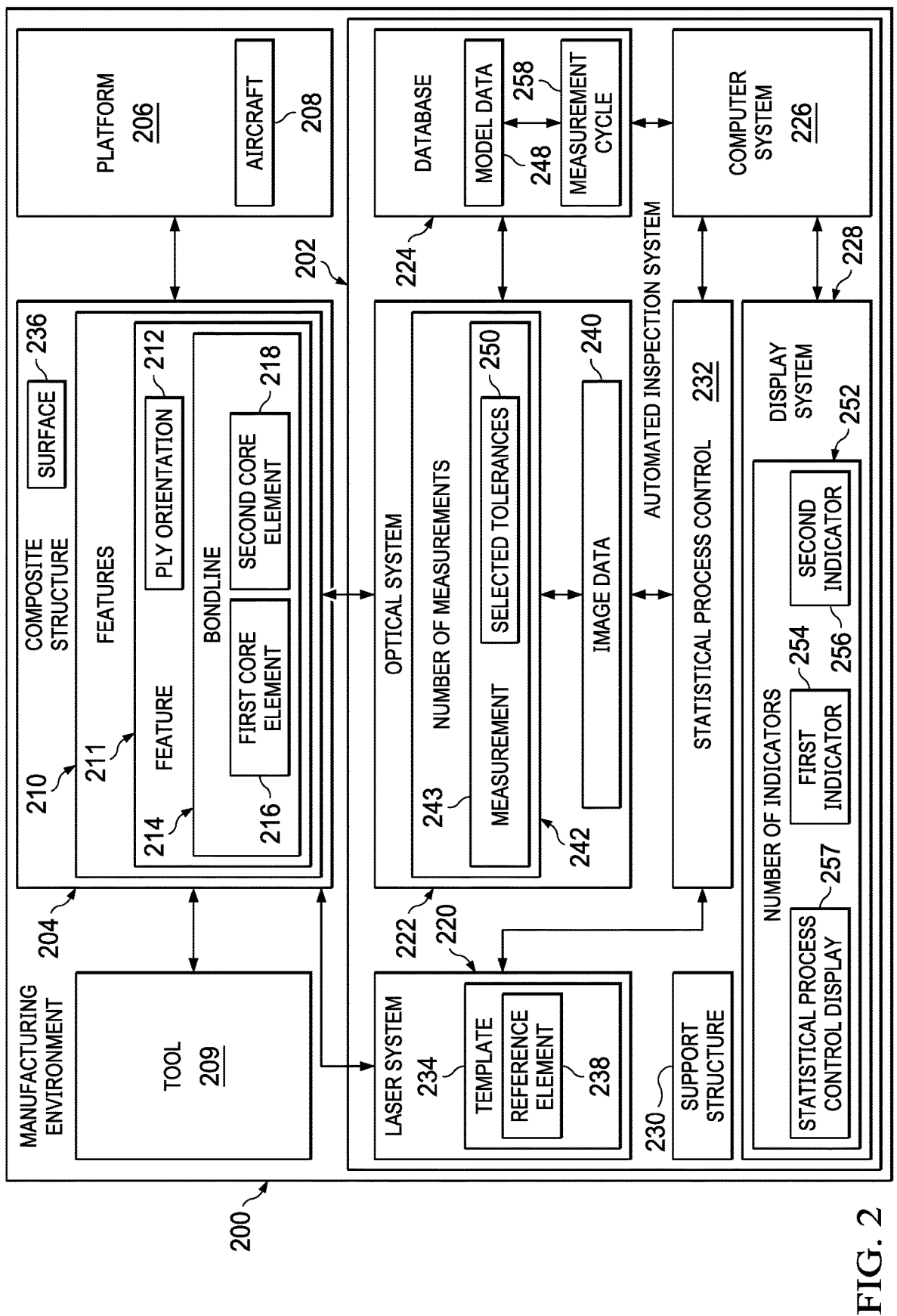
FIG. 2 is an illustration of a block diagram of a manufacturing environment in accordance with an illustrative embodiment.

Turning now to FIG. 2, an illustration of a block diagram of a manufacturing environment is depicted in accordance with an illustrative embodiment. Manufacturing environment 200 is an environment where components within automated inspection system 202 may be used to inspect composite structure 204.

Composite structure 204 is a structure made from one or more composite materials and configured for use in platform 206. Platform 206 may be, for example, without limitation, a mobile platform, a stationary platform, a land-based structure, an aquatic-based structure, or a space-based structure. More specifically, platform 206 may be an aircraft, a surface ship, a tank, a personnel carrier, a train, a spacecraft, a space station, a satellite, a submarine, an automobile, a power plant, a bridge, a dam, a house, a manufacturing facility, a building, and other suitable platforms.

Platform 206 takes the form of aircraft 208 in this illustrative example. When composite structure 204 is manufactured for aircraft 208, composite structure 204 may be, for example, without limitation, a stringer, a spar, a rib, a panel, a stabilizer, a skin panel, or some other suitable structure configured for use in aircraft 208.

In this illustrative example, composite structure 204 may take the form of a composite layup or assembly. Composite structure 204 is positioned on tool 209. Tool 209 has a desired shape for composite structure 204.

As illustrated, tool 209 comprises multiple parts configured to support and hold composite structure 204 in place during processing and inspection. Tool 209 may include one or more support structures such as a clamp, a bladder, a ballast, a block or some other suitable structure for holding composite structure 204 in place during processing.

Composite structure 204 may comprise at least one of a pre-preg material, a honeycomb core, or some other suitable feature. The pre-preg material may take the form of tapes or tows laid up on tool 209.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

Composite structure 204 has features 210 in this illustrative example. Feature 211 is one of features 210. Feature 211 may be selected from at least one of ply orientation 212, distance 213 at bondline 214 between first core element 216 and second core element 218 (Tmax value), or some other suitable feature. Each of the plies used to form composite structure 204 have ply orientation 212. When composite structure 204 has a honeycomb core, two pieces of core join at bondline 214. Thus, bondline 214 is the joint between first core element 216 and second core element 218.

As depicted, automated inspection system 202 comprises laser system 220, optical system 222, database 224, computer system 226, display system 228, and support structure 230. These components are used not only to measure features 210, but also to provide statistical process control 232 during formation of composite structure 204 and other similar structures.

Laser system 220 is a laser projection device. Laser system 220 comprises a number of laser heads configured to project template 234 onto surface 236 of composite structure 204 in this illustrative example. As used herein, "a number of" when used with reference to items means one or more items. Thus, a number of lasers is one or more lasers. Laser system 220 may include one or more heads. Each head is configured to project one laser line within its working range.

Template 234 also may be known as, and referred to as, an overhead laser template (OLT). Template 234 visually depicts reference element 238 for feature 211 in composite structure 204. The location and orientation of reference element 238 in template 234 is determined by at least one of design specification requirements, design control limits, government regulations, manufacturing standards, or some other suitable command media.

As illustrated, optical system 222 comprises one or more optical components. For example, without limitation, optical system 222 may include at least one of a camera, a video recording device, or some other optical component. Optical system 222 is configured to measure feature 211 in relation to reference element 238 from template 234 and create image data 240. Image data 240 may take the form of digital measurements, an image, or some other type of data.

In this illustrative example, optical system 222 scans over composite structure 204 to take number of measurements 242 of features 210. Number of measurements 242 of features 210 may be one or more measurements of the same feature, one or more measurements of different types of features, or a combination thereof. In this illustrative example, optical system 222 takes measurement 243 of feature 211. Image data 240, then, is based on measurement 243 of feature 211 in conjunction with number of measurements 242 of all features 210.

Database 224 stores model data 248. Model data 248 may be used to create template 234 projected by laser system 220. Model data 248 may be based on the digital engineering definition for the part being built. Model data 248 differs between parts and may include at least one of ply orientation, Tmax value, bondline location, material type, or some other suitable type of data. Model data 248 may take the form of numerical values, a computer-generated visual model, an image, or some other type of data.

As depicted, computer system 226 comprises a number of components configured to compare image data 240 generated by optical system 222 to model data 248 in database 224 and determine whether measurement 243 of feature 211 is within selected tolerances 250. Computer system 226 may include hardware, software, wireless network components, Bluetooth, and/or other suitable components.

Selected tolerances 250 include a range of acceptable values for number of measurements 242 for features 210. Selected tolerances 250 may include control limits and specification limits. Control limits may be determined by the capability of the process. Specification limits may be determined by, for example, without limitation, industry regulations, client design needs, engineering specifications, or some other parameter.

Based on the comparison between image data 240 and model data 248, display system 228 displays number of indicators 252. Number of indicators 252 may be selected from at least one of an audio indicator, a visual indicator, a vibration, or some other suitable type of indicator.

Number of indicators 252 includes first indicator 254, second indicator 256, and statistical process control display 257 in this illustrative example. Display system 228 is configured to display number of indicators 252 based on whether measurement 243 of feature 211 is within selected tolerances 250.

Display system 228 may display first indicator 254 when measurement 243 is within selected tolerances 250. For example, without limitation, first indicator 254 may be a green visual indicator. In a similar fashion, display system 228 may display second indicator 256 when measurement 243 is outside selected tolerances 250. For example, without limitation, second indicator 256 may be a red visual indicator.

In other illustrative examples, second indicator 256 may be displayed when measurement 243 is approaching the maximum tolerance value. Second indicator 256 may cause computer system 226 to stop manufacturing of composite structure 204 such that processes may be altered to substantially reduce undesired inconsistencies in the part.

Statistical process control display 257 visually displays data on display system 228 in real time. Statistical process control display 257 may comprise a graph, a chart, a spreadsheet, or display real-time measurement data in some other suitable manner.

As illustrated, database 224 stores image data 240 captured by optical system 222. Database 224 is configured to store image data 240 from each measurement cycle 258. Database 224 also may integrate image data 240 from each measurement cycle 258 with model data 248 to refine model data 248.

Image data 240 may be used to provide statistical process control 232. Because image data 240 is stored in database 224, historical statistical process control 232 is achieved. Statistical process control display 257 may be updated in real time as number of measurements 242 of features 210 are taken to provide statistical process control 232. In other words, automated inspection system 202 tracks the progress of the manufacturing process using image data 240 to provide statistical process control 232.

With an illustrative embodiment, automated inspection system 202 substantially reduces the need for human operators to manually measure features 210 of composite structure 204. Measurement and validation of features 210 is completed in a matter of minutes. Automated inspection system 202 also monitors the health of manufacturing processes by indicating when measurement 243 for feature 211 is approaching maximum tolerance or is outside selected tolerances. Thus, the illustrative embodiments provide a desired level of statistical process control based on any number of limits as defined by the manufacturer. As a result, composite structure 204 is formed more quickly, more accurately, and with less rework than with currently used solutions. Cost savings are realized from more efficient processes and the reduction of manpower.

Figure 3:
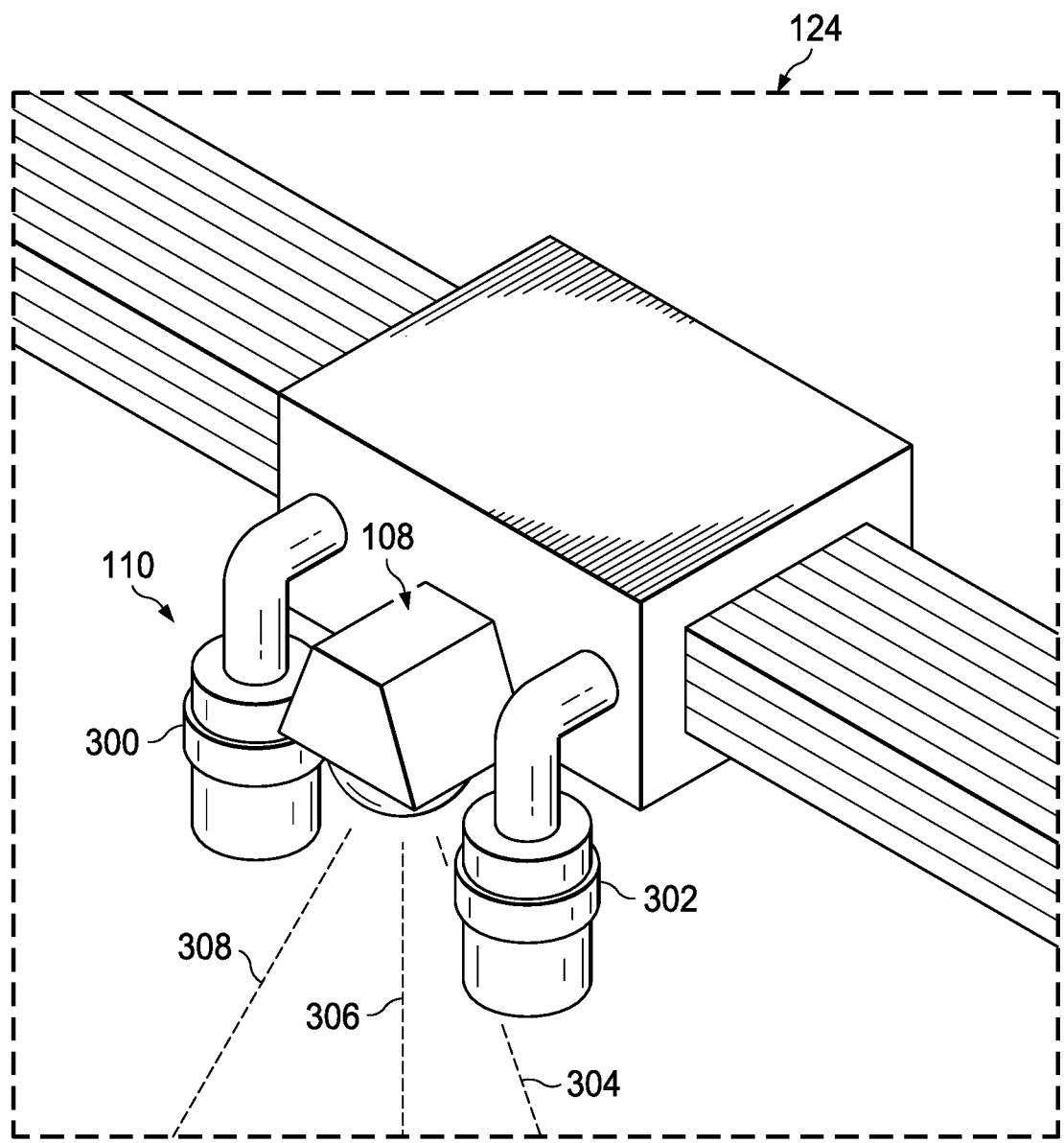
FIG. 3 is an illustration of a perspective view of an automated inspection system in accordance with an illustrative embodiment.

With reference next to FIG. 3, an illustration of a perspective view of an automated inspection system is depicted in accordance with an illustrative embodiment. FIG. 3 illustrates an example of physical implementations of components within automated inspection system 202 shown in block form in FIG. 2. A more-detailed view of section 124 from FIG. 1 is shown.

As depicted, optical system 110 includes camera 300 and camera 302. Laser system 108 includes laser line 304, laser line 306, and laser line 308.

Figure 4A:
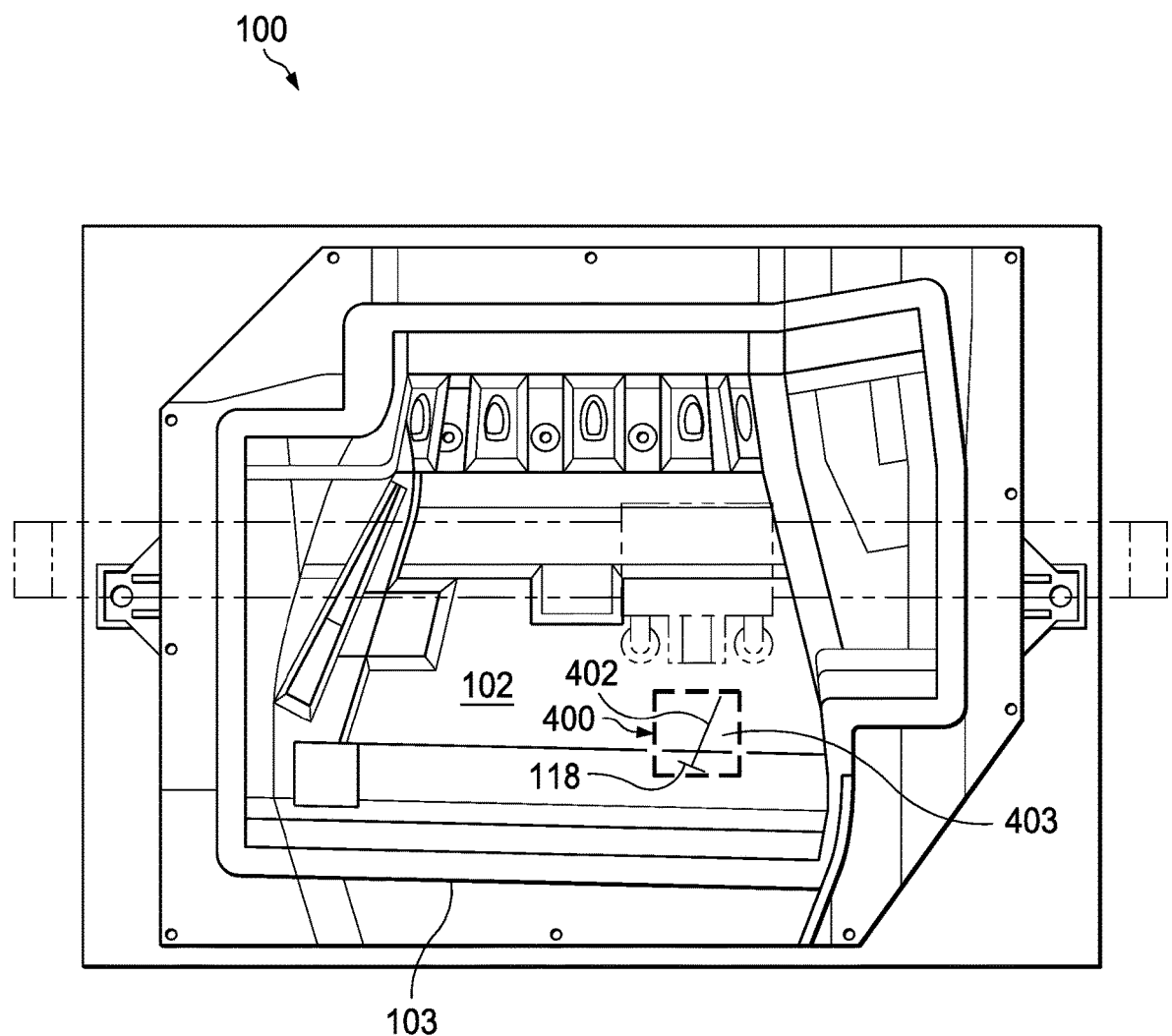
FIGS. 4A and 4B are illustrations of an overhead laser template in accordance with an illustrative embodiment.
Figure 4B:
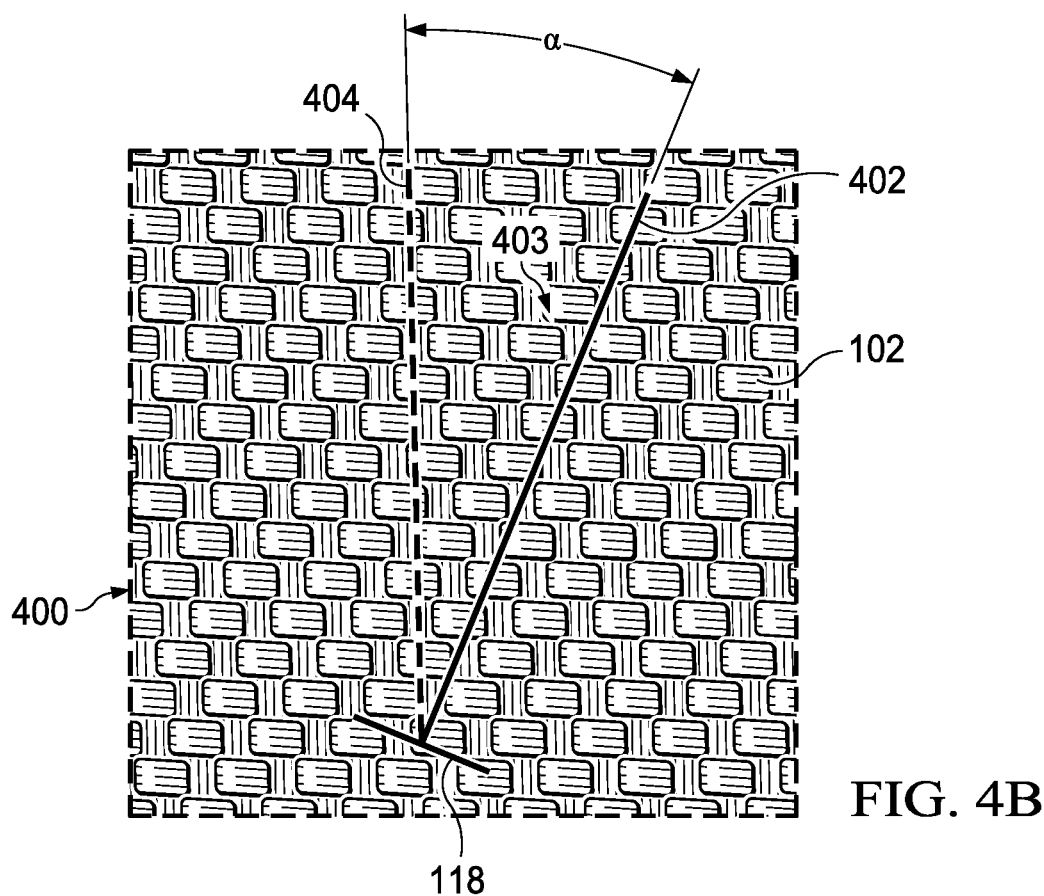

Turning now to FIGS. 4A and 4B, illustrations of an overhead laser template are depicted in accordance with an illustrative embodiment. FIG. 4A shows the overall view of the system while FIG. 4B corresponds to a close-up sectional view. Composite structure 102 and tool 103 are shown from above.

Automated inspection system 100 is shown in phantom in FIG. 4A. As illustrated, template 116 from laser system 108 is projected onto composite structure 102. Section 400 of composite structure 102 shows reference ply orientation 402 at location 403. Reference ply orientation 402 is a projection of nominal ply orientation in this illustrative example.

In FIG. 4B, ply orientation 404 represents the actual ply orientation of a ply in section 400 of composite structure 102. Automated inspection system 100 measures the ply orientation deviation from nominal and then sends the image data to computer system 112 for analysis.

Figure 5A:
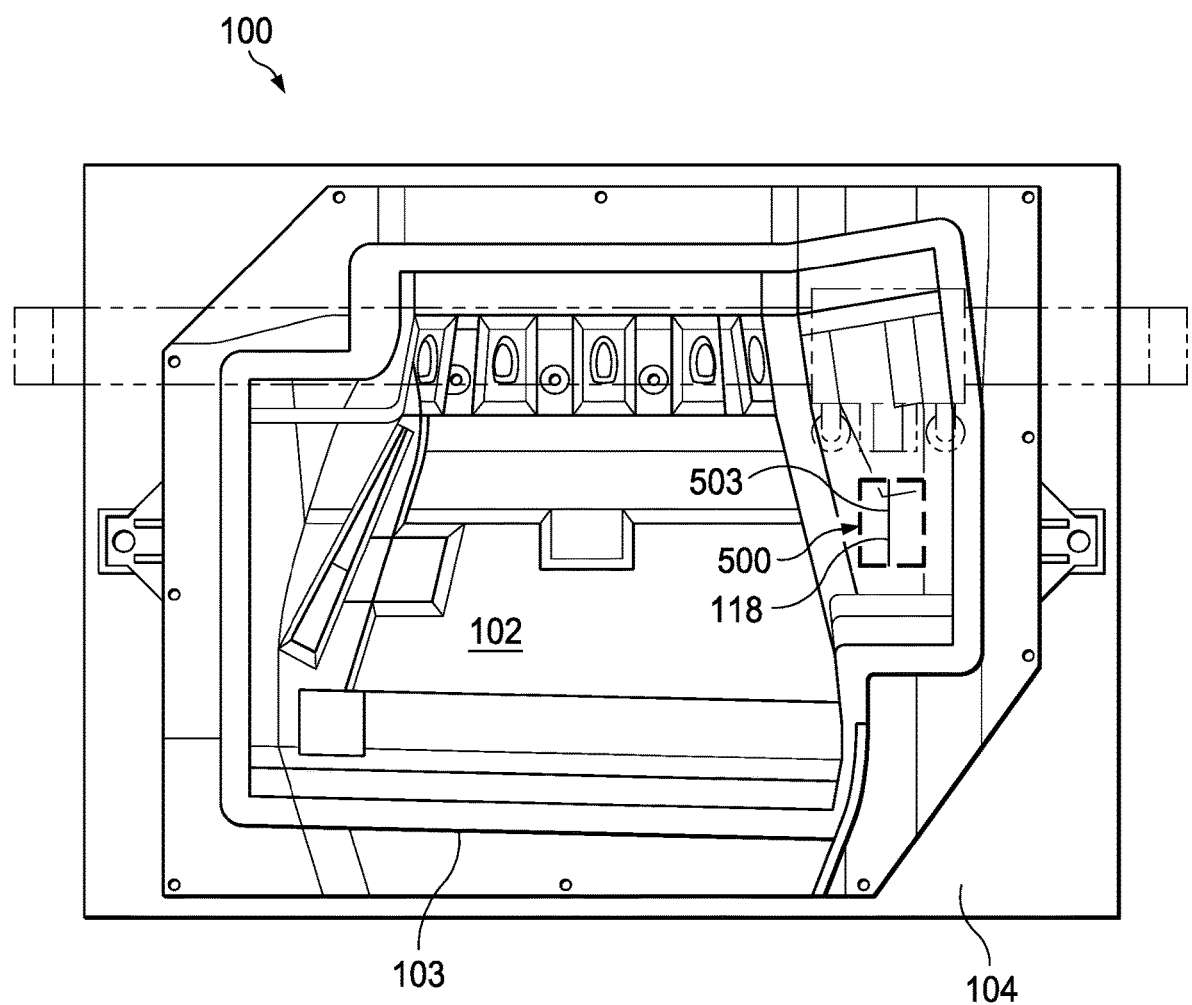
FIGS. 5A and 5B are illustrations of an overhead laser template in accordance with an illustrative embodiment.
Figure 5B:
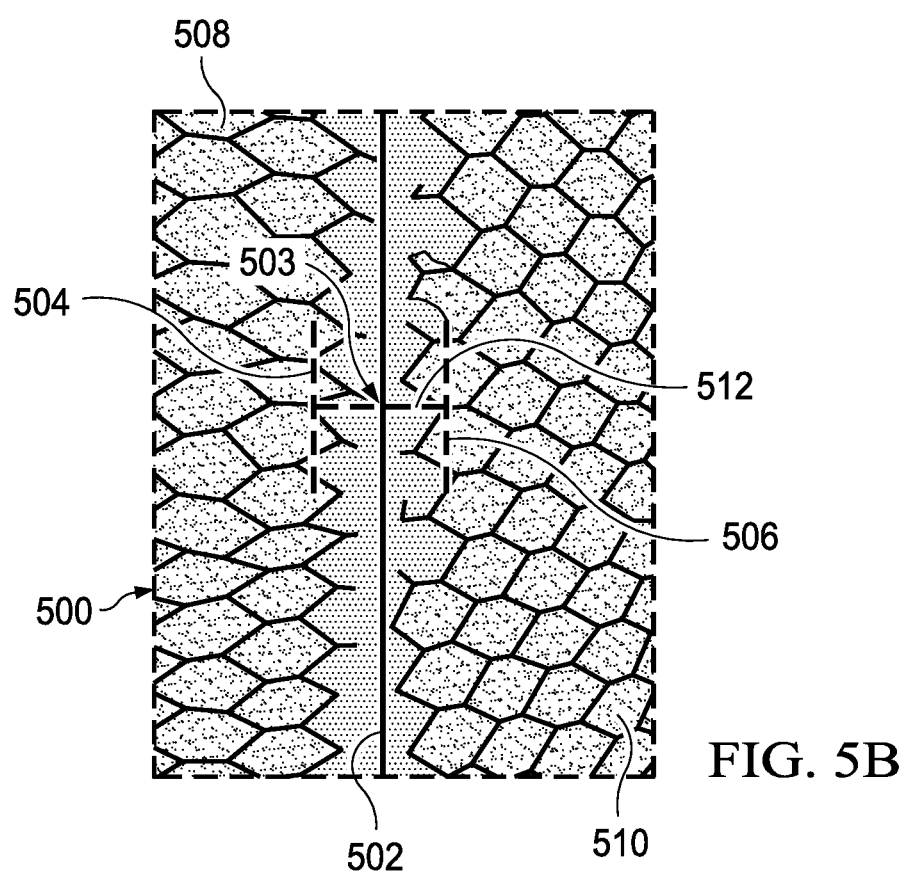

In FIGS. 5A and 5B, illustrations of an overhead laser template are depicted in accordance with an illustrative embodiment. FIG. 5A shows the overall view of the system while FIG. 5B corresponds to a close-up sectional view. Composite structure 102 and tool 103 are shown from above.

Automated inspection system 100 is shown in phantom in FIG. 5A. As depicted, template 116 from laser system 108 is projected onto composite structure 102. Section 500 of composite structure 102 shows line 502 projected onto its surface. Line 502 is the reference bondline location.

In FIG. 5B, line 504 and line 506 are created by image analysis based on the control limits or rules in computer system 112 for composite structure 102. Line 504 corresponds to core 508 and line 506 corresponds to core 510. Line 512 crosses line 502 at the precise location to be measured. Line 512 represents the actual Tmax value at location 503. The Tmax value will be compared with desired Tmax values at location 503 and stored in the database for future use. Line 502, then, is used to validate that the center of the bondline is located within specified tolerances.

The different components shown in FIG. 1 and FIGS. 3-5 may be combined with components in FIG. 2, used with components in FIG. 2, or a combination of the two. Additionally, some of the components in FIG. 1 and FIGS. 3-5 may be illustrative examples of how components shown in block form in FIG. 2 may be implemented as physical structures.

Other configurations for automated inspection system 100 may be implemented other than those shown in FIGS. 1 and FIGS. 3-5. For instance, although the illustrative embodiments are shown and described with reference to forming structures for aircraft applications, the illustrative embodiments can be used with any type of platform to inspect composite parts for that platform.

Further, even though FIG. 1 and FIGS. 3-5 depict a laser system with a single overhead laser template head multiple heads may be used, depending on the size of the tool. For example, two heads, five heads, eight heads, or some other number of heads may be present.

Figure 6:
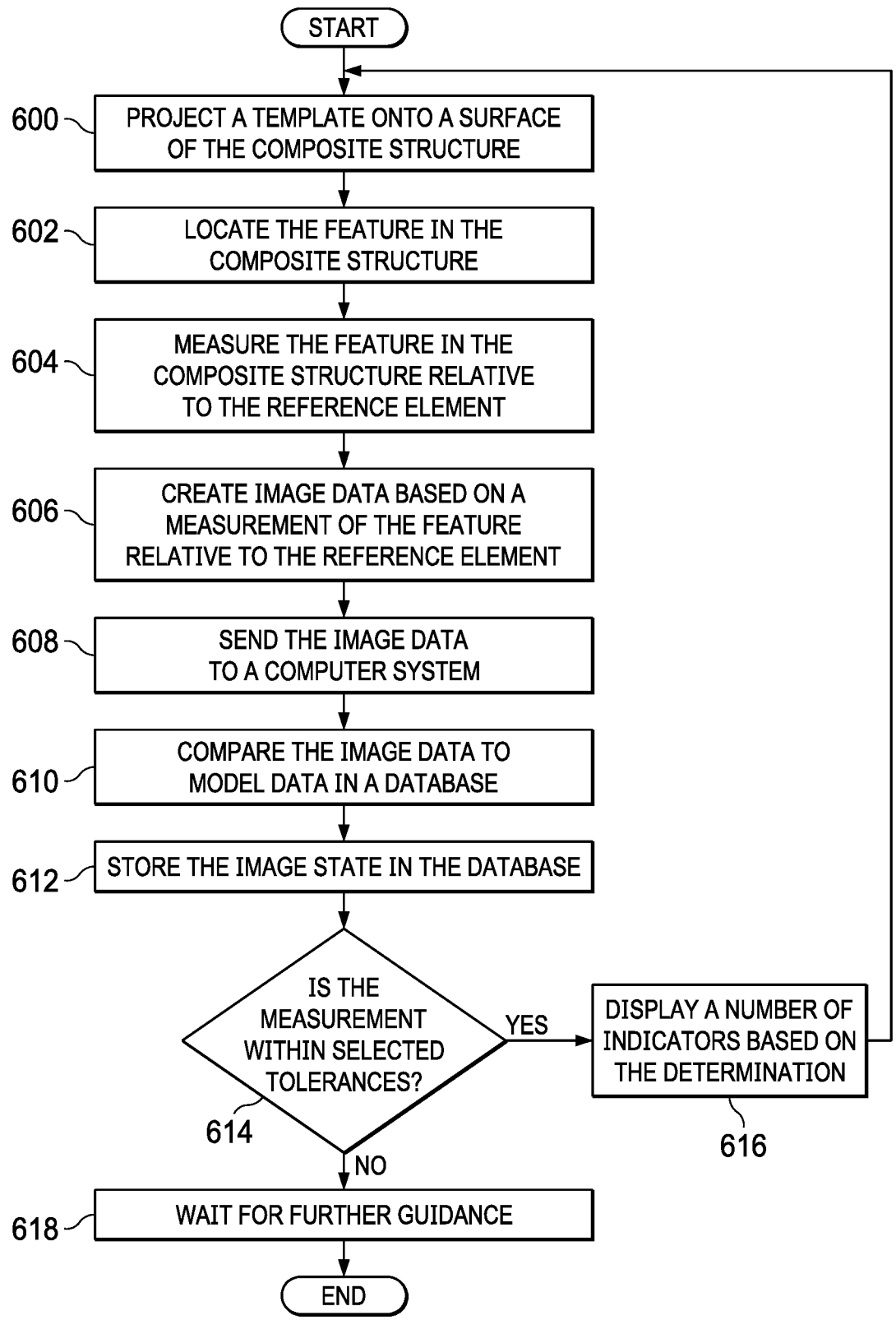
FIG. 6 is an illustration of a flowchart of a process for inspecting a composite structure in accordance with an illustrative embodiment.

With reference next to FIG. 6, an illustration of a flowchart of a process for inspecting a composite structure is depicted in accordance with an illustrative embodiment. The method depicted in FIG. 6 may be used with automated inspection system 202 to inspect feature 210 of composite structure 204 in FIG. 2.

The process begins by projecting a template onto a surface of the composite structure (operation 600). The template visually depicts a reference element at a desired location on the surface of the composite structure. Next, the process locates the feature in the composite structure (operation 602).

The process then measures the feature in the composite structure relative to the reference element (operation 604). Image data is created based on a measurement of the feature relative to the reference element (operation 606). The image data is sent to a computer system (operation 608). The image data is compared to model data in a database (operation 610). The image data is stored in the database (operation 612).

A determination is made as to whether the measurement is within selected tolerances (operation 614). The process displays a number of indicators based on the determination (operation 616). If the measurement is within selected tolerances, the process returns to operation 600. If not, the process waits for further guidance (operation 618), with the process terminating thereafter. Guidance may be given by a human operator, pursuant to a pre-programmed workflow, by a robot, or in some other manner.

Figure 7:
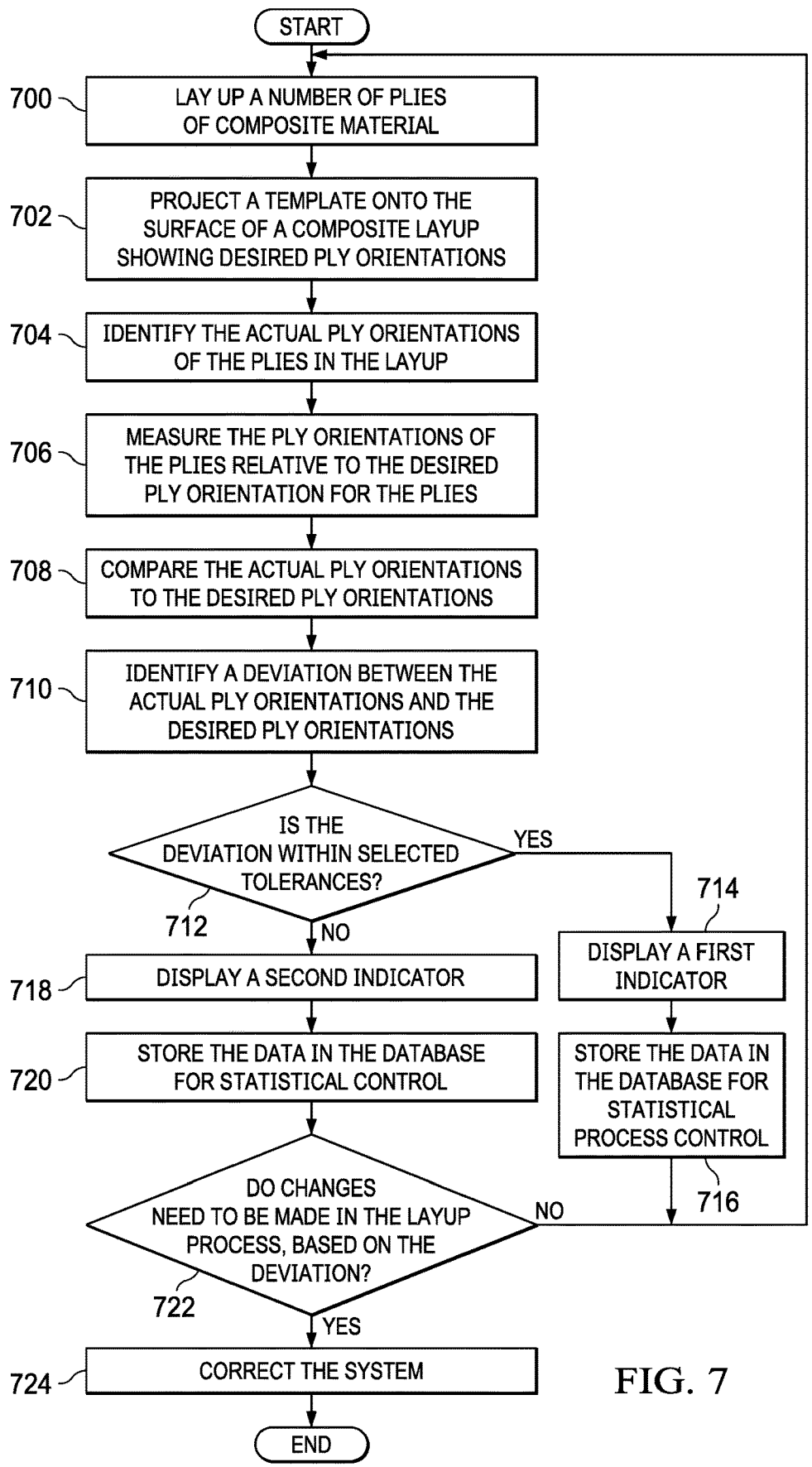
FIG. 7 is an illustration of a flowchart of a process for inspecting ply orientation in a composite structure in accordance with an illustrative embodiment.

In FIG. 7, an illustration of a flowchart of a process for inspecting ply orientation in a composite layup is depicted in accordance with an illustrative embodiment. The method depicted in FIG. 7 may be used with automated inspection system 202 to inspect ply orientation 212 of composite structure 204 in FIG. 2.

The process begins by laying up a number of plies of composite material (operation 700). Next, the process projects a template onto the surface of a composite layup showing desired ply orientations (operation 702). The process then identifies the actual ply orientations of the plies in the layup (operation 704). The ply orientations of the plies are measured relative to the desired ply orientation for the plies (operation 706).

Thereafter, the process compares the actual ply orientations to the desired ply orientations (operation 708). The process identifies a deviation between the actual ply orientations and the desired ply orientations (operation 710). A determination is made as to whether the deviation in ply orientations are within selected tolerances (operation 712).

If the deviation is within selected tolerances, the process displays a first indicator (operation 714). The process next stores the data in the database for statistical process control (operation 716), then returning to operation 700 to continue the layup process.

If the deviation is outside selected tolerances, the process displays a second indicator (operation 718). The data is stored in the database for statistical process control (operation 720). The display system may display a process control graph and values onscreen. A determination is then made as to whether changes need to be made in the layup process, based on the deviation (operation 722). If changes need to be made, the system is corrected (operation 724), with the process terminating thereafter. If not, the process returns to operation 700.

Figure 8:
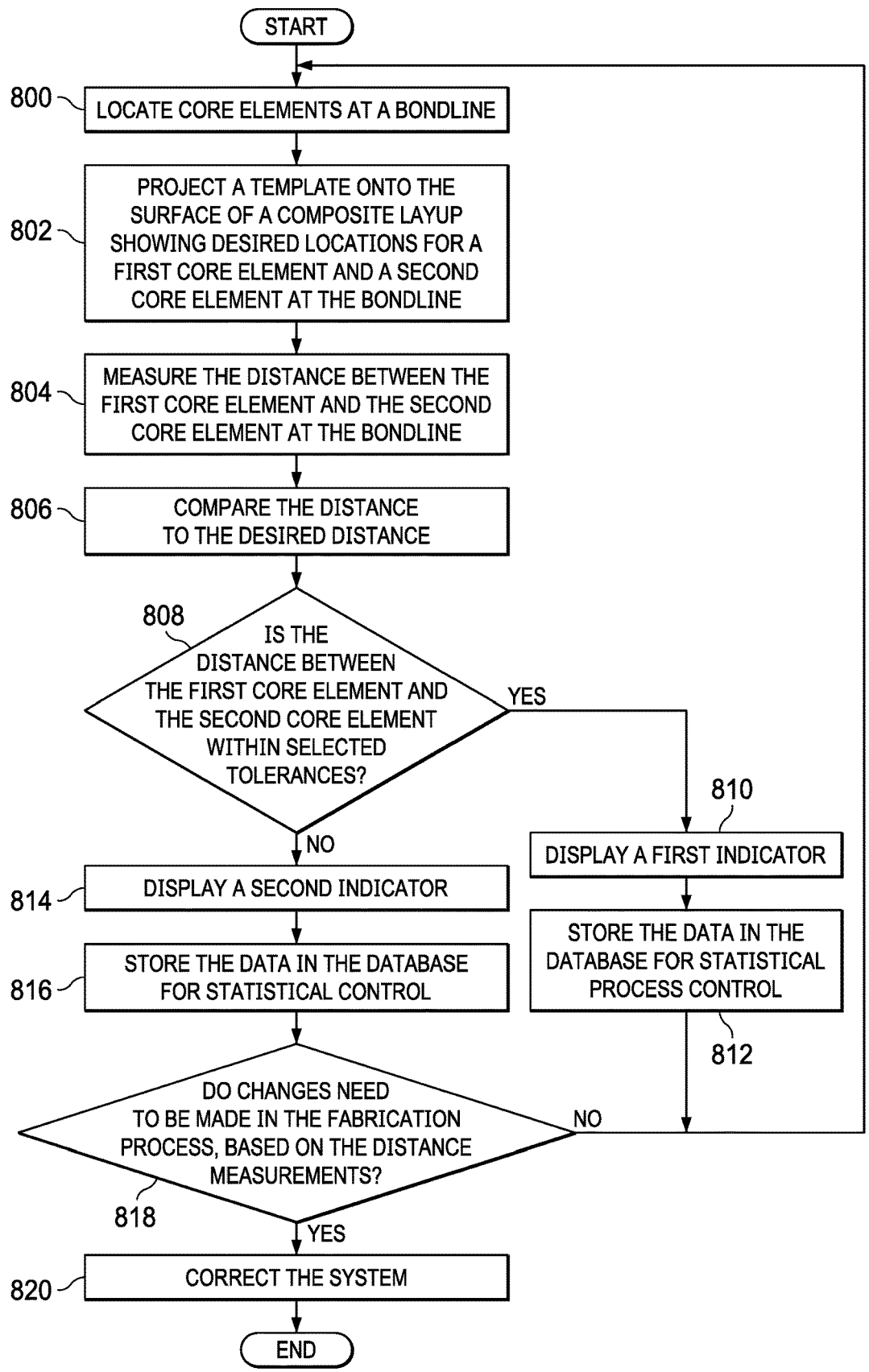
FIG. 8 is an illustration of a flowchart of a process for inspecting a distance at a bondline between two core features in a composite structure in accordance with an illustrative embodiment.

Turning now to FIG. 8, an illustration of a flowchart of a process for inspecting a distance at a bondline between two core features is depicted in accordance with an illustrative embodiment. The method depicted in FIG. 8 may be used with automated inspection system 202 to inspect distance 213 between first core element 216 and second core element 218 in composite structure 204 in FIG. 2.

The process begins by locating core features at a bondline (operation 800). Next, the system projects a template onto the surface of a composite layup showing desired locations for a first core element and a second core element at the bondline (operation 802). The process then measures the distance between the first core element and the second core element at the bondline (operation 804).

Thereafter, the process compares the distance to the desired distance (operation 806). A determination is made as to whether the distance between the first core element and the second core element is within selected tolerances (operation 808). If the distance is within selected tolerances, the process displays a first indicator (operation 810). The process then stores the data in the database for statistical process control (operation 812), returning to operation 800 to continue the layup process.

If the distance is outside selected tolerances, the process displays a second indicator (operation 814). The data is stored in the database for statistical control (operation 816). A determination is then made as to whether changes need to be made in the fabrication process, based on the distance measurements (operation 818). If changes need to be made, the system is corrected (operation 820), with the process terminating thereafter. If not, the process returns to operation 800.

Figure 9:
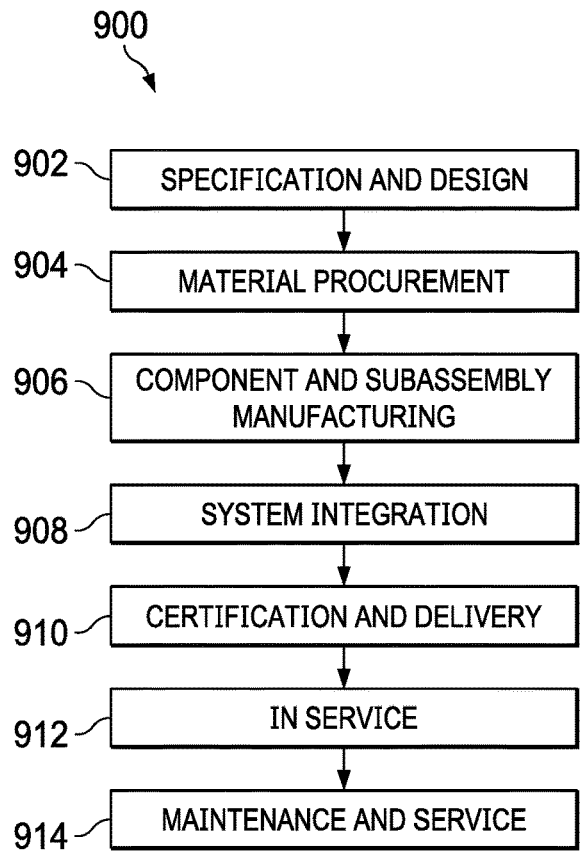
FIG. 9 is an illustration of a block diagram of an aircraft manufacturing and service method in accordance with an illustrative embodiment.
Figure 10:
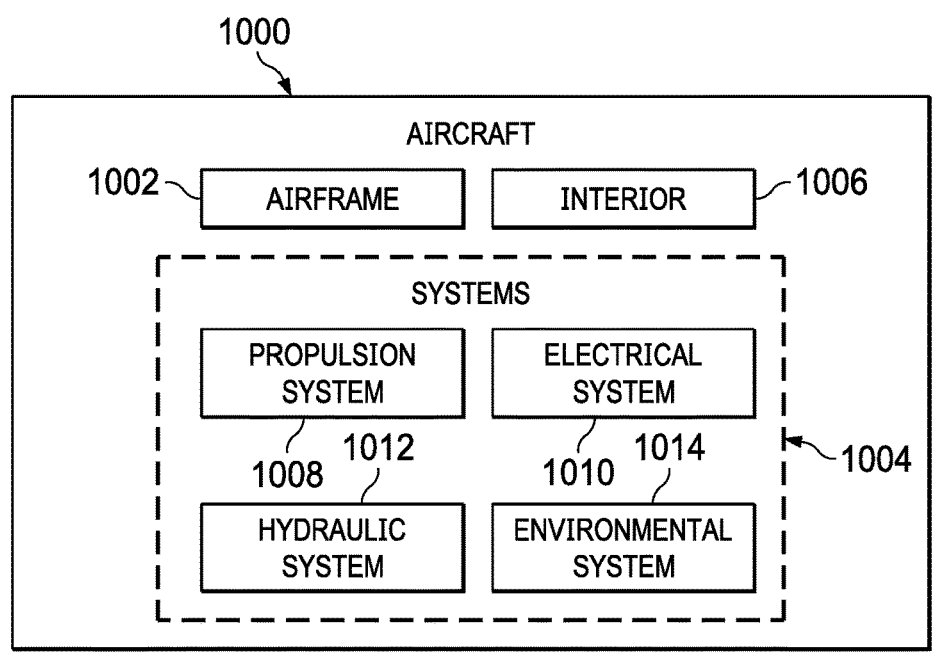
FIG. 10 is an illustration of a block diagram of an aircraft in which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Composite structure 204 from FIG. 2 may be inspected using automated inspection system 202 during component and subassembly manufacturing 906. In addition, automated inspection system 202 may be used during routine maintenance and service 914 as part of a modification, reconfiguration, or refurbishment of aircraft 1000 in FIG. 10.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 10, an illustration of a block diagram of an aircraft is depicted in which a composite structure made using an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

With the use of an illustrative embodiment, inspection is completed much more rapidly than with currently used systems. Little to no manpower is needed to inspect the composite structure. Manufacturers will have information about ply orientation, Tmax values, and other characteristics of the composite part in real time, giving them the ability to validate and refine the manufacturing process as it continues. As a result, this statistical process control allows manufacturers to maintain more consistent quality of composites, reduce rework, and reduce time offline. Data is stored in the database and integrated with model data to further improve the process. Cost savings are realized due to efficiency gains, as well as the substantial reduction in the need for human operators to manually take measurements.

The illustrative embodiments provide such tight control of the manufacturing process, inspection down the line may not be necessary. In other words, because the use of an illustrative embodiment allows manufacturers to instantly react to process changes, they can be sure that parts are made to specifications without redundant inspection at a later time.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An automated inspection system for a composite structure comprising:
   an optical system configured to locate a feature in the composite structure, take a measurement of the feature in relation to a reference element, and create image data based on the measurement, wherein the feature comprises a distance at a bondline between a first core element and a second core element;
   a database of model data; and
   a computer system configured to compare the image data to the model data and determine whether the measurement of the feature is within selected tolerances.

2. The automated inspection system of claim 1 further comprising:
   a laser system configured to project a template onto a surface of the composite structure, wherein the template visually depicts the reference element on the composite structure.

3. The automated inspection system of claim 1, wherein the feature comprises ply orientation.

4. The automated inspection system of claim 1, wherein the database is configured to store the image data from each measurement cycle for statistical process control.

5. The automated inspection system of claim 4, wherein the database is configured to integrate the image data with the model data in the database.

6. The automated inspection system of claim 1 further comprising:
   a display system configured to display a number of indicators based on whether the measurement of the feature is within the selected tolerances.

7. The automated inspection system of claim 6, wherein the display system is configured to display a first indicator when the measurement is within the selected tolerances and a second indicator when the measurement is outside the selected tolerances.

8. A method for inspecting a composite structure, the method comprising:
   measuring a feature in the composite structure using an optical system relative to a reference element, wherein measuring the feature comprises measuring a distance at a bondline between a first core element and a second core element;
   creating image data based on a measurement of the feature relative to the reference element;
   sending the image data to a computer system;
   comparing the image data to model data in a database; and
   determining whether the measurement of the feature is within selected tolerances.

9. The method of claim 8 further comprising:
   projecting a template onto a surface of the composite structure, wherein the template visually depicts the reference element on the composite structure.

10. The method of claim 9 further comprising:
    storing the image data in the database; and
    tracking the image data in real-time to provide statistical process control.

11. The method of claim 10 further comprising:
    displaying a number of indicators on a display system.

12. The method of claim 11, wherein displaying the number of indicators on the display system comprises:
    displaying a first indicator when the measurement is within the selected tolerances; and
    displaying a second indicator when the measurement is outside the selected tolerances.

13. The method of claim 8 further comprising:
    determining a position of the reference element using the model data in the database.

14. The method of claim 8, wherein measuring the feature comprises:
    measuring a deviation between actual ply orientation and desired ply orientation of a ply in the composite structure.

15. An automated inspection system for a composite structure for an aircraft, the automated inspection system comprising:
    a laser system configured to project a template of a reference element on a surface of the composite structure;
    an optical system configured to create image data derived from a measurement of a feature in the composite structure in relation to the reference element, wherein the feature is a distance at a bondline between a first core element and a second core element;
    a database of model data for the feature in the composite structure; and
    a computer system configured to compare the image data to the model data and determine whether the measurement of the feature is within selected tolerances.

16. The automated inspection system of claim 15, wherein the feature comprises a ply orientation of a ply in the composite structure.

17. The automated inspection system of claim 15 further comprising:
    a display system having a first indicator displayed when the measurement is within selected tolerances and a second indicator displayed when the measurement is outside the selected tolerances.

18. The automated inspection system of claim 15, wherein the model data comprises:
    the image data from previous measurement cycles.

19. The automated inspection system of claim 15, wherein the database is configured to integrate the image data with the model data in the database.

20. The automated inspection system of claim 15 further comprising:
    a display system configured to display a number of indicators based on whether the measurement of the feature is within the selected tolerances.

* * * * *